United States Patent
Nakajima

(10) Patent No.: US 6,892,240 B1
(45) Date of Patent: May 10, 2005

(54) BIDIRECTIONAL COMMUNICATION SYSTEM AND METHOD

(75) Inventor: Kazuaki Nakajima, Tokyo (JP)

(73) Assignee: NEC Corporation, Tokyo (JP)

(*) Notice: Subject to any disclaimer, the term of this patent is extended or adjusted under 35 U.S.C. 154(b) by 702 days.

(21) Appl. No.: 09/663,396

(22) Filed: Sep. 15, 2000

(30) Foreign Application Priority Data

Sep. 17, 1999 (JP) .............................. 11-263073

(51) Int. Cl.[7] .......................................... G06F 10/173
(52) U.S. Cl. ...................... 709/227; 709/219; 709/225; 370/252
(58) Field of Search ................................ 709/224, 225, 709/227, 232, 226, 219, 203, 217, 218, 220, 228, 231, 236; 370/252, 401

(56) References Cited

U.S. PATENT DOCUMENTS

| | | | | |
|---|---|---|---|---|
| 5,694,546 A | * | 12/1997 | Reisman ..................... | 705/26 |
| 5,828,840 A | * | 10/1998 | Cowan et al. .............. | 709/203 |
| 5,938,737 A | * | 8/1999 | Smallcomb et al. ........ | 709/247 |
| 6,047,323 A | * | 4/2000 | Krause ........................ | 709/227 |
| 6,098,108 A | * | 8/2000 | Sridhar et al. .............. | 709/239 |
| 6,104,716 A | | 8/2000 | Crichton et al. ............ | 370/401 |
| 6,370,561 B1 | * | 4/2002 | Allard et al. ................ | 709/203 |
| 6,397,259 B1 | * | 5/2002 | Lincke et al. ............... | 709/236 |
| 6,535,920 B1 | * | 3/2003 | Parry et al. .................. | 709/231 |
| 6,611,862 B2 | * | 8/2003 | Reisman ...................... | 709/217 |
| 6,654,796 B1 | * | 11/2003 | Slater et al. ................. | 709/220 |
| 6,665,721 B1 | * | 12/2003 | Hind et al. .................. | 709/227 |

FOREIGN PATENT DOCUMENTS

JP 10-285216 10/1998

OTHER PUBLICATIONS

Office Action of Korean Patent Office in Korean for Korean Patent Application No. 10–2000–0060681, with English translation, citing two references.

Japanese Laid–Open Patent Publication No. 1–151049 with English Abstract.

Korean Laid–Open Patent Application No. 1995–9630, the content of which is summarized in the English translation of the office action of the Korean Patent Office.

* cited by examiner

Primary Examiner—Zarni Maung
Assistant Examiner—Khanh Quang Dinh
(74) Attorney, Agent, or Firm—Foley & Lardner LLP

(57) ABSTRACT

A bidirectional communication method allowing real-time information sharing among clients on an Intranet through a server on the Internet in disclosed. After establishing two connections between the server and the client through an HTTP proxy, one of the two connections is set to a downstream connection using GET method of HTTP to allow real-time data transfer from the server to the client. Thereafter, the other of the two connections is set to an upstream connection using POST method of HTTP to allow real-time data transfer from the client to the server. After having set the upstream connection and the downstream connection, data cells are transferred between the server and the client through the upstream connection and the downstream connection.

14 Claims, 6 Drawing Sheets

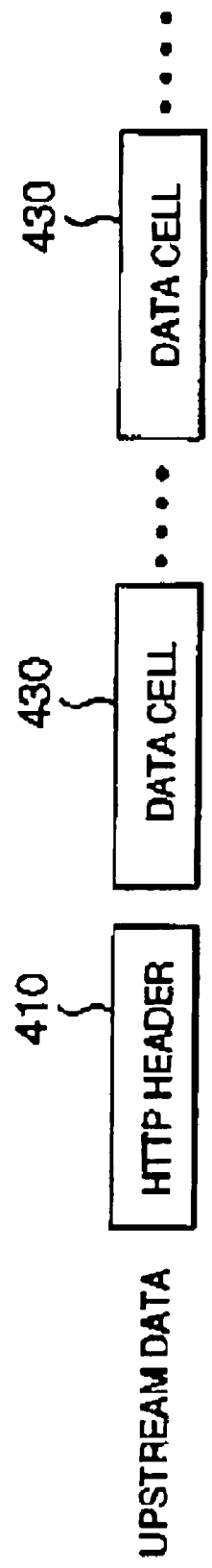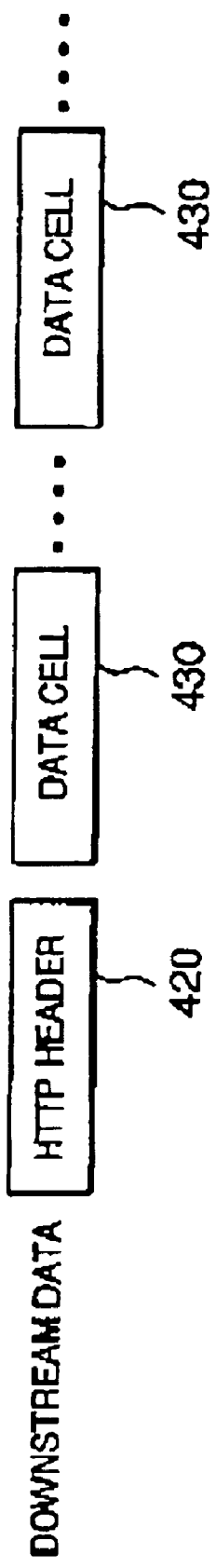

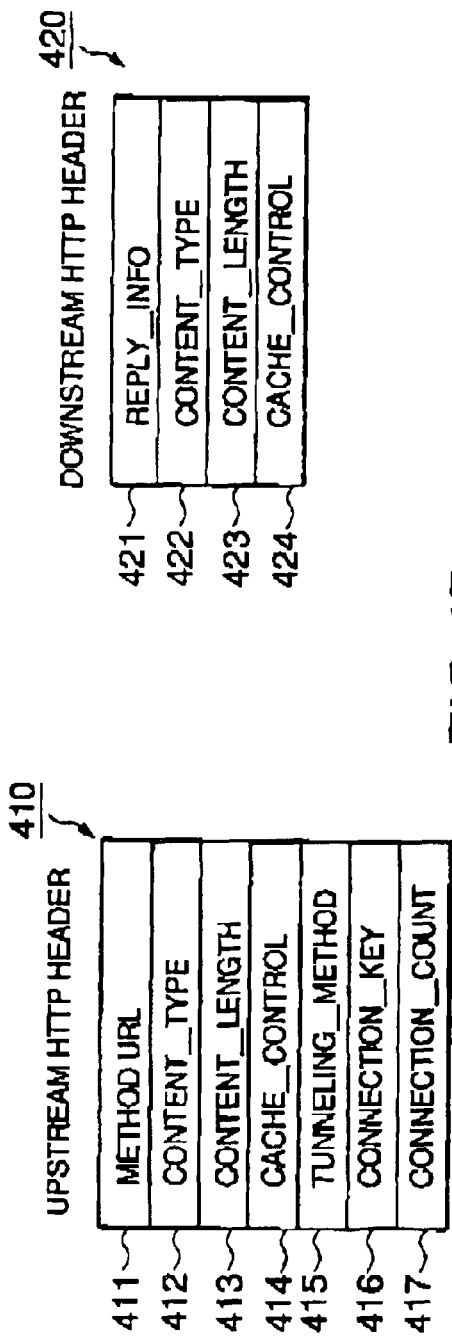
FIG.4A
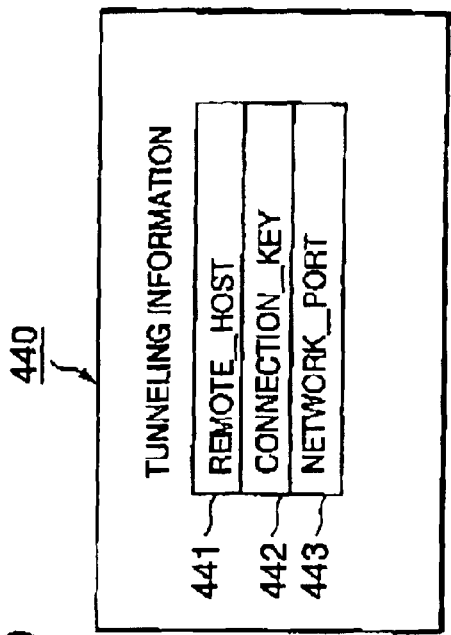
FIG.4B
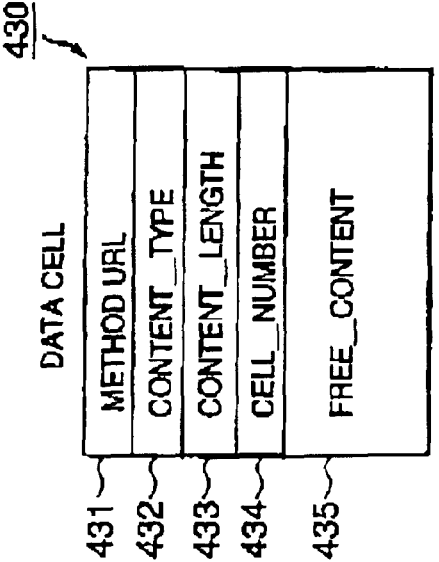
FIG.4D
FIG.4C

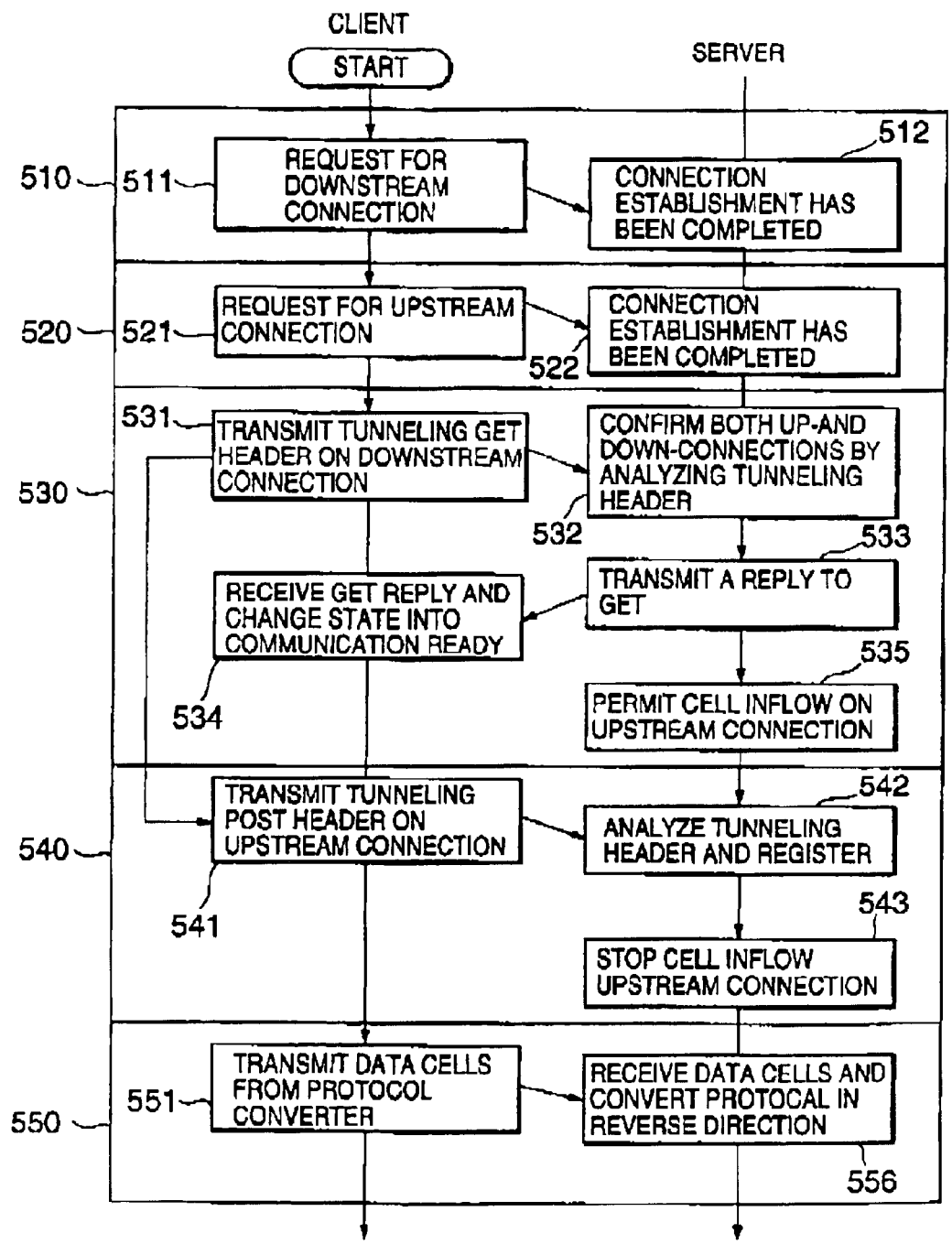

BIDIRECTIONAL COMMUNICATION SYSTEM AND METHOD

BACKGROUND OF THE INVENTION

1. Field of the Invention

The present invention generally relates to a bidirectional communication system through a node handling HTTP (HyperText Transfer Protocol) traffic, and in particular to a bidirectional communication system having a HTTP tunneling function to allow real-time information sharing among a plurality of users such as groupware users.

2. Description of the Related Art

Real-time information sharing on the Internet can be achieved by using a dedicated protocol to connect between a server and a plurality of clients. For example, when a change to shared information is made at a client, the change is promptly transferred to the server.

In the case of connecting a so-called Intranet to the Internet, security is one of the most important concerns. A common method for ensuring security is to install a firewall or a proxy server, which is a secure single point of attachment to the Internet. In many cases, a firewall host allows only HTTP traffic to pass through as specified by the firewall administrator.

In such a system using a firewall as a secure single point of attachment to the Internet, it is necessary to devise a method of passing through the firewall while ensuring security. In general, a HTTP protocol converting method of converting transmission data into HTTP traffic is employed. The reason is that almost all firewalls are provided with an HTTP proxy and therefore there is no need of changing the existing system software or configuration.

An a conventional example, a lightweight secure tunneling protocol or LSTP has been proposed in Japanese Patent Application Unexamined Publication No. 10-285216 corresponding to U.S. Pat. No. 6,104,716. The LSTP permits communicating across one or more firewalls by using a middle server or proxy.

However, HTTP is a communications protocol such that an interaction between a server and a client in completed in a single transaction. More specifically, when receiving a request, the server in permitted only to transmit HTML (HyperText Makeup Language) pages to the client that has originated the request. Therefore, in the case of a real-time information sharing system employing the HTTP protocol converting method, all the clients periodically transmit an information update request to the server so as to share the same information among the clients. A typical example is "Chat" in an electronic conference system using an HTML browser.

As described above, an information update request is periodically transmitted to the server in the case of no information update, resulting in increased needless traffic in the network and increased communication charge.

Further, since only a client originates the information update request, sufficient real-time information update cannot be achieved.

There has been "RealAudio" system, as another conventional example, which supports live and on-demand audio over the Internet by keeping an HTTP transaction to allow long time data stream. However, the RealAudio system provides only one-directional communication. Therefore, it cannot be applied to a bidirectional communication system.

SUMMARY OF THE INVENTION

An object of the present invention is to provide a bidirectional communications system and method allowing real-time information sharing with improved traffic.

Another object of the present invention is to provide a bidirectional communications system and method allowing data transfer with the reduced amount of overhead through a proxy between a client and a server.

Further another object of the present invention is to provide a bidirectional communications system and method allowing stable communication through a proxy to be provided to higher-level application.

According to the present invention, a bidirectional communication method between a server and each of a plurality of clients through an HTTP (Hyper Text Transfer Protocol) communication gate allowing only HTTP traffic to pass through, includes the steps of: a) establishing two connections between the server and the client; b) setting one of the two connections to an upstream connection using POST method of HTTP to allow real-time data transfer from the client to the server; c) setting the other of the two connections to a downstream connection using GET method of HTTP to allow real-time data transfer from the server to the client; and d) transferring data between the server and the client through the upstream connection and the downstream connection.

At the client, in the step (b), a POST-method HTTP header may be generated and a content_length field of the POST-method HTTP header may be set to a permissible maximum value. In the step (d), data cells may be generated at timing of data transfer requested by a client application and the data cells may be transferred to the server through the HTTP communication gate in real time.

The step (c) may include the steps of: at the server, c.1) generating a GET-method HTTP header; c.2) setting a content_length field of the GET-method HTTP header to a permissible maximum value; and the step (d) may include the step of: at the server, d.3) generating at least one data cell at timing of data transfer requested by a server application; d.4) transferring the at least one data cell to the client through the HTTP communication gate in real time.

The HTTP communication gate may be an HTTP proxy having a caching function. In this case, the client adds a temporary unique character string to content location information of each of a POST-method HTTP header and a header of a data cell so as to avoid the caching function of the HTTP proxy. The server ignores the temporary unique character string added in the content location information received from the client.

According to another aspect of the present invention, a bidirectional communication method includes the steps of: a) establishing two connections between the server and the client; b) setting one of the two connections to a downstream connection using GET method of HTTP to allow real-time data transfer from the server to the client; c) after having set the one of the two connections to the downstream connection, setting the other of the two connections to an upstream connection using POST method of HTTP to allow real-time data transfer from the client to the server; d) after having set the upstream and downstream connections, transferring data between the server and the client through the upstream connection and the downstream connection.

The client may performs the following steps of: e) sending a tunneling GET header to the server through the one of the two connections; and f) sending a tunneling POST header to the server through the other of the two connections independently of sending the tunneling GET header. The server may perform the following step of: g) when receiving the tunneling POST header before the tunneling GET header, stopping data reception from the client until the downstream connection has been set.

The client may generate a POST-method HTTP header including a unique keyword. The server may manage the upstream and downstream connections using the unique keyword received from the client. When a connection formed using a unique keyword is disconnected, the client makes reconnection to the server using the unique keyword previously used.

According to another aspect of the present invention, a bidirectional communication system includes: a server on the Internet; a plurality of clients on an Intranet; and an HTTP (Hyper Text Transfer Protocol) communication gate allowing only HTTP traffic to pass through so as to connect the server and each of the plurality of clients. Each of the clients includes, a connection controller for establishing two connections between the server and the client; a tunneling header generator for generating a tunneling header so that one of the two connections is set to an upstream connection using POST method of HTTP and the other of the two connections is set to a downstream connection using GET method of HTTP; a first protocol converter for converting client application data into a data block to be transferred to the server; and a first reverse protocol converter for converting a received data block from the server into server application data. The server includes: a tunneling header analyzer for analyzing the tunneling header received from the client to determine whether the upstream and downstream connections have been set; a second protocol converter for converting server application data into a data block to be transferred to the client; and a second reverse protocol converter for converting a received data block from the client into client application data.

The server may further include an inflow suppressor for suppressing data block inflow from the client when receiving a tunneling POST header before a tunneling GET header and releasing inhibition of the data block inflow when the tunneling GET header has been received.

BRIEF DESCRIPTION OF THE DRAWINGS

FIG. 3A is a diagram showing an upstream data format in an HTTP transaction;

FIG. 3B is a diagram showing a downstream data format in the HTTP transaction;

FIG. 4A is a diagram showing a format of an upstream HTTP header;

FIG. 4B is a diagram showing a format of a downstream HTTP header;

FIG. 4C is a diagram showing a format of data cell;

FIG. 4D is a diagram showing a format of tunneling information;

FIG. 5 is a flowchart showing an initial connection sequence between the client and the server according to the embodiment of the present invention.

DETAILED DESCRIPTION OF THE PREFERRED EMBODIMENT

A bidirectional communication system according to an embodiment of the present invention is composed mainly of a server on the Internet, a plurality of clients on an Intranet, and a HTTP communication gate allowing only HTTP traffic to pass through.

Figure 1:
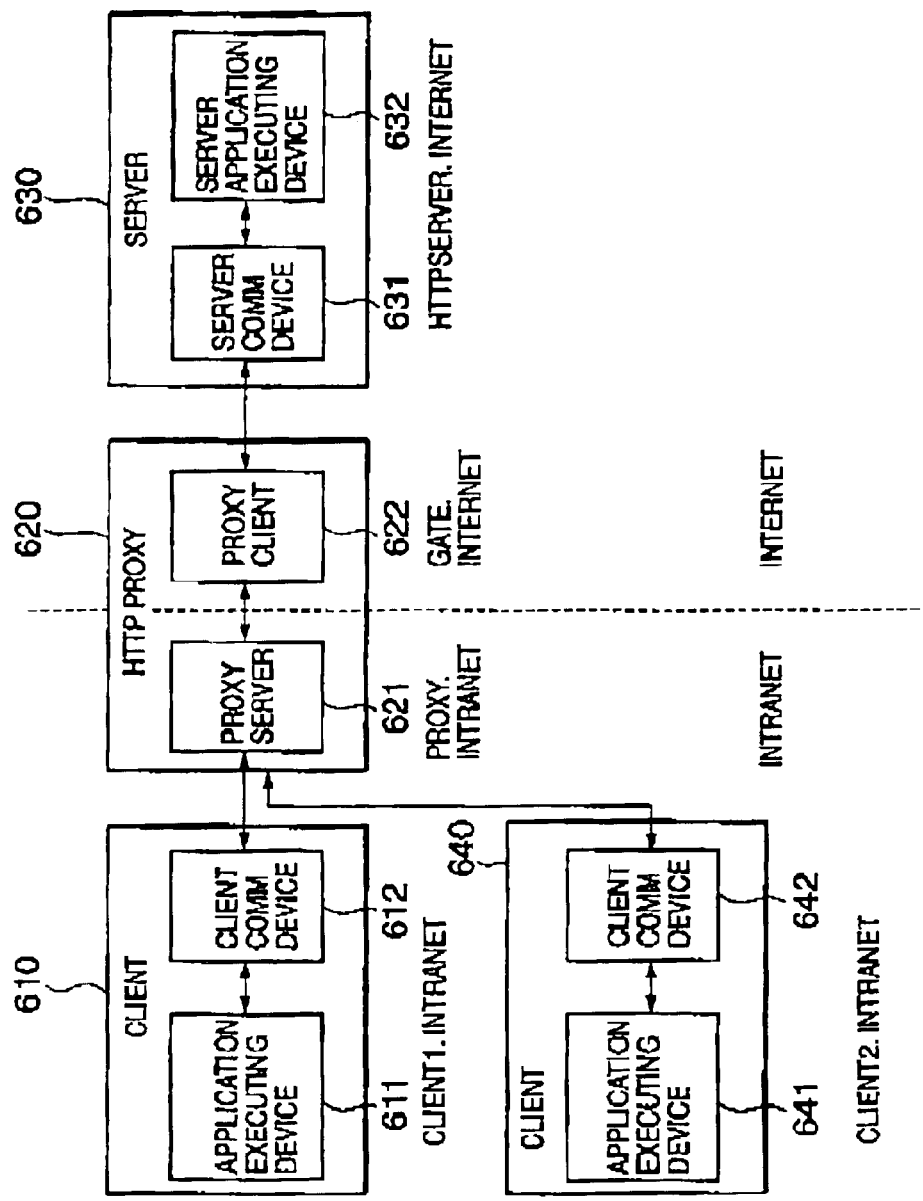
FIG. 1 is a block diagram showing a bidirectional communication system according to an embodiment of the present invention.

As shown in FIG. 1, it is assumed for simplicity that the HTTP communication gate is an HTTP proxy (or gateway) 620 which is a secure single point between a server 630 on the Internet and two clients 610 and 640 on an Intranet. The clients 610 and 640 have the same circuit configuration. The server 630 may accommodate one or more client. Here, the client 640 may have a communication function of connecting directly to the server 630 through an existing network such as a public telephone network.

The HTTP proxy 620 has a function of exchanging HTTP traffic between the Internet and the Intranet. Therefore, the HTTP proxy 620 is an agent that functions as a server from the point of view of the clients 610 and 640 and as a client from the point of view of the server 630.

The client 610 includes an application executing device 611 and a client communication device 612. The client 640 includes an application executing device 641 and a client communication device 642. The application executing device (611 or 641) is a groupware tool allowing information sharing via the server 630. The details of clients 610 and 640 will be described later.

The HTTP proxy 620 includes a proxy server 621 and a proxy client 622. The proxy server 621 functions as an HTTP server, which exchanges HTTP transactions with the proxy client 622. When receiving an HTTP transaction from the proxy sever 621, the proxy client 622 transmits the same HTTP transaction to the server 630. As described before, the HTTP proxy 620 permits only HTTP transactions to pass through and therefore it in a single gate to get access to the server 630.

The server 630 includes a server communication device 631 and a server application executing device 632. The server application executing device 632 has a server function of providing information to the client application executing devices 611 and 641. The server and client application executing devices 632, 611, and 641 are tools that are used to operate in an Intranet using a dedicated protocol.

In this embodiment, the client communication devices 612 and 642 and the server communication device 631 are incorporated in the client and server modules, respectively, allowing necessary information to pass through the HTTP proxy 620. In other words, a communication means for gaining access to the server through the HTTP proxy 620 is realized.

Next, the details of the bidirectional communication system according to the embodiment will be described with reference to FIGS. 2–4.

Figure 2:
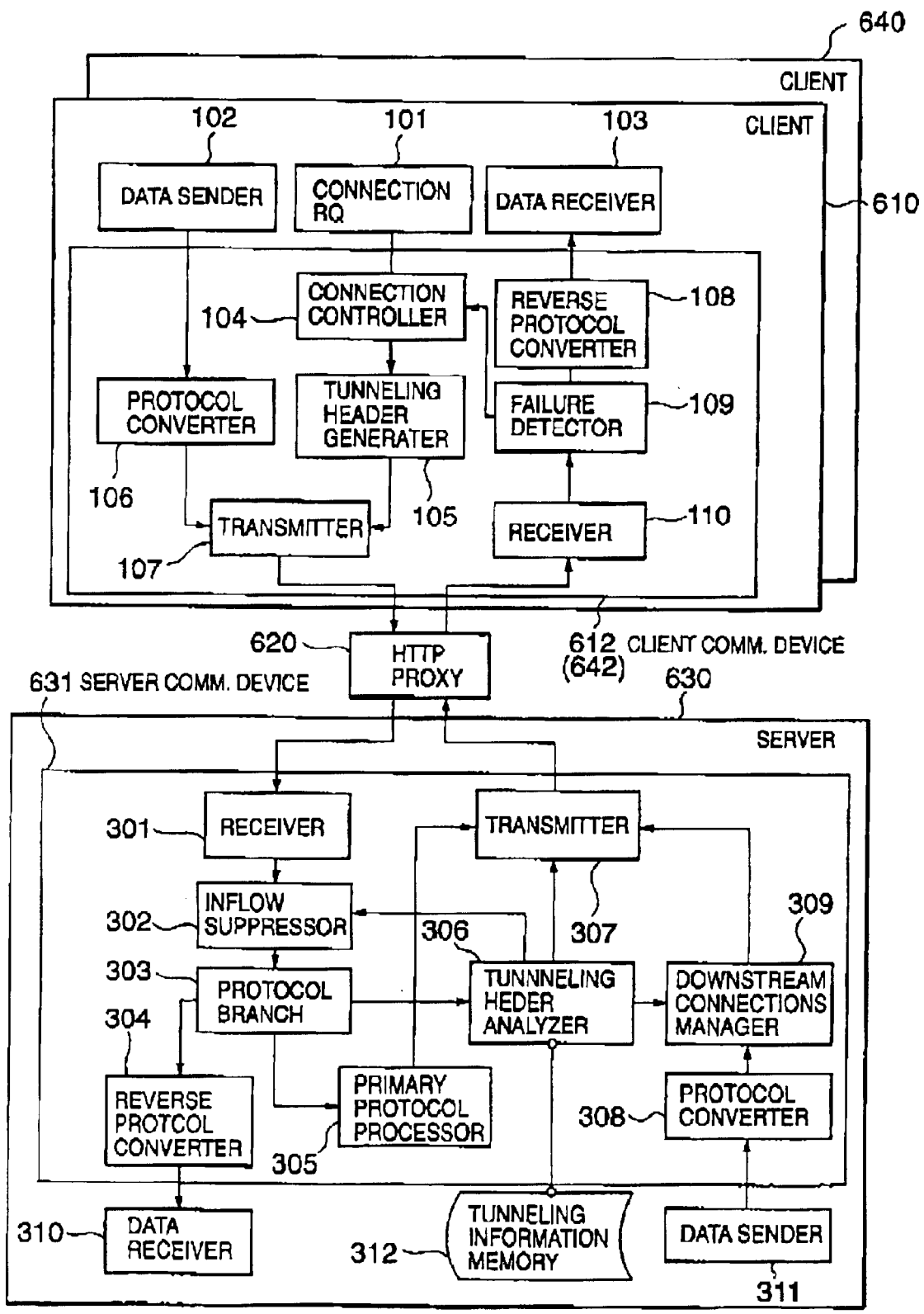
FIG. 2 is a detailed block diagram showing internal configurations of client and server in the embodiment of the present invention.

Referring to FIG. 2, the client 610 is provided with a connection request section 101, a data sander 102, and a data receiver 103 in addition to the client communication device 612. Since it is the same with the client 640 as described before, hereafter, taking the client 610 as an example, the details will be described.

The connection request section 101 requests a connection to the server 630 from a connection controller 104, which uses a tunneling header generator 105 to establish upstream and downstream connections to the server 630. The data sender 102 outputs data to be transmitted to a protocol converter 106, which performs protocol conversion such that the data is converted into encapsulated data cells as described later. An HTTP header generated by the tunneling header generator or the data cell from the protocol converter 106 is transmitted by a transmitter 107 to the HTTP proxy 620.

On the other hand, a receiver 110 receives a data cell from the server 630 through the HTTP proxy 620 and outputs it to a failure detector 109. The failure detector 109 determines whether a failure occurs. If a failure is detected, the failure detector 109 notifies the connection controller 104 of the occurrence of a failure. If no failure occurs, then the received data cell is transferred to a reverse protocol converter 108. The reverse protocol converter 108 removes the header portion from the received data cell and transfers the data portion to the data receiver 103.

The server 630, as shown in FIG. 2, is provided with a data receiver 310, a data sender 311, and a tunneling information memory 312 in addition to the server communication device 631. A receiver 301 receives information from the client 610 or 640 through the HTTP proxy 620 and outputs it to an inflow suppressor 302.

As described later, the inflow suppressor 302 controls the inhibition of data inflow depending on a result of tunneling header analysis performed by a tunneling header analyzer 306. More specifically, the inflow suppressor 302 stops data inflow until upstream and downstream connections have been both completed. When they have been both completed, the inflow suppressor 302 releases the inhibition of data inflow.

A protocol branch section 303 checks the protocol of the received information to transfer it to a corresponding one of a reverse protocol converter 304, a primary protocol processor 305, and the tunneling header analyzer 306. If the received information is a data cell, then it is transferred to the reverse protocol converter 304, which removes the header portion from the received data cell and transfers the data portion to the data receiver 310. If the received information is an ordinary HTTP transaction, it is transferred to the primary protocol processor 305. And, if the received information is a tunneling header, then it is transferred to the tunneling header analyzer 306.

On the other hand, the data sender 311 outputs data to be transmitted to a protocol converter 308, which performs protocol conversion such that the data is converted into encapsulated data cells as described later. The data cell from the protocol converter 308 is output to a transmitter 307 through a downstream connections manager 309 and then is transmitted by the transmitter 307 to the HTTP proxy 620.

Referring to FIGS. 3A and 3B and FIGS. 4A–4D, the function of each block in the client and server will be described more specifically.

As shown in FIG. 4A, an upstream HTTP header 410 includes the following fields: METHOD_URL 411; CONTENT_TYPE 412; CONTENT_LENGTH 413; CACHE_CONTROL 414; TUNNELING_METHOD 415; CONNECTION_KEY 416; and CONNECTION_COUNT 417.

METHOD_URL 411 includes METHOD of HTTP (GET or POST), the address of the server 630, and the location information of contents. The METHOD of HTTP uses POST for upstream connection and GET for downstream connection, as described later. In this embodiment, URL has an ordinary content identifier followed by a temporary keyword so as to prevent the HTTP proxy 620 from caching it.

TUNNELING_METHOD 415 is used to determine which one of tunneling information and ordinary HTTP information the received information is. CONNECTION_KEY 416 is used to make the server 630 recognize that the established upstream and downstream connections belong to the same bidirectional communication. CONTENT_LENGTH 413 is set to the maximum permissible value of the system.

As shown in FIG. 4B, a downstream HTTP header 420 includes the following fields: REPLY_INFO 421; CONTENT_TYPE 422; CONTENT_LENGTH 423: and CACHE_CONTROL 424.

As shown in FIG. 4C, a data cell 430 includes the following fields: METHOD_URL 431; CONTENT_TYPE 432; CONTENT_LENGTH 433; CELL_NUMBER 434; and FREE_CONTENT 435. The METHOD_URL 431 is the same as the METHOD_URL 411 of the upstream HTTP header 410 or 420 so as to perform the communication connection consistency check for a data cell 430 and to check whether a change to data occurs at a proxy or the like which may be caused by the fact that a transmission interval of data cells is not limited. Experiences show that there is the highest possibility that the upper bytes of a data cell 430 are missed. In such a case, the data cell will be skipped. CONTENT_TYPE 432 is used to determine whether the data is application data. CONTENT_LENGTH 433 is used to indicate the amount of data. CELL_NUMBER 434 is used to indicate the producing order of the data cell. FREE_CONTENT 435 is used to store the same data as application data.

As shown in FIG. 4D, tunneling information 440 includes the following fields: REMOTE_HOST 441; CONNECTION_KEY 442; and NETWORK_PORT 443.

Return to FIG. 2, the reverse protocol converter 304 of the server 630 extracts data FREE_CONTENT 435 from a data cell 430 and transfers it to the data receiver 310. The primary protocol processor 305 has an ordinary HTTP server function and outputs a reply transaction to the transmitter 307.

The tunneling header analyzer 306 analyzes the header information of the data cell received from the client 610, which was generated by the tunneling header generator 105 of the client 610. As a result of analyzing the header information, the tunneling header analyzer 306 extracts tunneling information 440 (see FIG. 4D) and stores it into the tunneling information memory 312.

The tunneling header analyzer 306 further controls the inflow suppressor 302 depending on METHOD of the tunneling information 440. More specifically, if the tunneling information 440 indicates POST-method and the GET-method tunneling information has been never received, then the tunneling header analyzer 306 instructs the inflow suppressor 302 to stop data inflow through a corresponding upstream connection from then on. If the GET-method tunneling information has been received, then the tunneling header analyzer 306 instructs the inflow suppressor 302 to release the inhibition of inflow. Therefore, the transmission/reception timing of data cells can be prevented from deviations regardless of which one of upstream and downstream connections is established earlier. In the case of GET-method tunneling information, the tunneling header analyzer 306 produces a downstream HTTP header 420 and outputs it to the transmitter 307. Further, the tunneling header analyzer 306 notifies the downstream connections manager 309 of the connection used to transmit the downstream HTTP header 420 to the HTTP proxy 620.

The protocol converter 308 encapsulates the data received from the data sender 311 to produce a data cell 430 and outputs it to the downstream connections manager 309. The downstream connections manager 309 retrieves the predetermined downstream connection for the data cell 430 and outputs the data cell destined to the HTTP proxy 620 to the transmitter 307.

An appropriate server application allows multi-cast communication with all clients connected to data receiver 310 and sender 311 of the server 630. Therefore, it is possible to perform bidirectional communication between the server 630 and the clients 610 and 640 through the HTTP proxy 620.

In the case where the HTTP communication gate is the HTTP proxy 620, it is necessary to take the caching service of the proxy into consideration.

More specifically, the caching service of the proxy is avoided in the present embodiment by adding a temporary unique character string to URL in an upstream HTTP header (tunneling header) 410, that is, by adding a cache-off instruction to the upstream HTTP header. A change to URL of an upstream HTTP header (tunneling header) 410 allows a present upstream connection to be different from an upstream connection used by another client or the upstream connection previously used by the same client. This prevents the HTTP proxy from sending the content of the cache back to the client without connecting to the server communication device 631.

At the client 610, the connection controller 104 established two connections to the HTTP proxy 620: one for upstream and the other for downstream. The HTTP proxy 620 connects the client 610 and the server 630 in one of the following manners that the HTTP proxy 620 connects to the client 610 before connecting to the server 630 and that the HTTP proxy 620 connects directly to the server 630. If the failure detector 109 detects a disconnection or timeout, then the connection controller 104 performs reconnection to the server 630.

When the connection to the server 630 has been completed, the tunneling header generator 105 generates an HTTP header 410. The transmitter 107 transmits the HTTP header generated by the tunneling header generator 105 or a data cell 430 from the protocol converter 106 to the HTTP proxy 620. The protocol converter 106 performs protocol conversion such that the data is encapsulated to produce the data cell 430.

When the receiver 110 receives a data cell from the server 630 through the HTTP proxy 620, the receiver 110 outputs it to a failure detector 109. If a failure is detected, the failure detector 109 notifies the connection controller 104 of the occurrence of a failure. If no failure occurs, then the received data cell is transferred to the reverse protocol converter 108. The reverse protocol converter 108 removes the header portion from the received data cell and transfers the data FREE_CONTENT 435 to the data receiver 103.

In the above-described system, the POST method is used for upstream connection and the GET method used for downstream connection and the connection controller 104 maintains these two connections to the serves 630 during bidirectional communication. Therefore, overhead for connection in needed for the first time and then data cells 430 can be transferred in real time as shown in FIGS. 3A and 3B.

Since the respective protocol converters 106 and 308 encapsulate application data to produce data cells 430 as shown in FIG. 4C, the application data can be transferred between the client 610 and the server 630 through the HTTP proxy 620 according to the dedicated protocol independently of HTTP traffic.

Further, the inflow suppressor 302 stops data inflow and releases the inhibition of data inflow under control of the tunneling header analyzer 306. As described before, if the tunneling information 440 indicates POST-method and the GET-method tunneling information has been never received, then the tunneling header analyzer 306 instructs the inflow suppressor 302 to stop data inflow through a corresponding upstream connection from then on. If the GET-method tunneling information has been received, then the tunneling header analyzer 306 instructs the inflow suppressor 302 to release the inhibition of inflow. Therefore, the inflow suppressor 302 allows the connection sequence to be changed and thereby a delay in connection can be eliminated. In other words, the transmission/reception timing of data cells can be prevented from deviations regardless of which one of upstream and downstream connections is established earlier.

Furthermore, the caching service of the HTTP proxy 620 can be easily avoided by adding a temporary unique character string to URL in an upstream HTTP header (tunneling header) 410. Therefore, it is ensured that data cells can be stably pass through the proxy 620.

OPERATION

It is assumed as shown in FIG. 1 that the address "client1.intranet" is assigned to the client 610, the address "client2.intranet" is assigned to the client 640, the address "proxy.intranet" is assigned to the proxy server 621, the address "gate.internet" is assigned to the proxy client 622, and the address "httpserver.internet" is assigned to the server 630.

When the client communication device 612 is connected to the server communication device 631 by two connections via the proxy server 621, an upstream HTTP header 410 for each of the two connections is transferred to the server communication device 631.

In the upstream HTTP header 410 for a downstream connection, the METHOD_URL 411 is "GET http://httpserver.internet/document1/getmethod_temp11223344HTTP/1.0". The first half "http://httpserver.internet/document1/" is usually used in an ordinary URL and the following "getmethod_temp11223344HTTP/1.0" is a temporary unique character string added. The temporary unique character string is ignored at the server communication device 631. Accordingly, each time reconnection or request of a client occurs, the HTTP proxy 620 recognizes it as a new document request, causing the cache service to be avoided. TUNNELING_METHOD 415 of an upstream HTTP header 410 stores a character string of "GET_VIA_TUNNELING", by which the server 630 recognizes the received HTTP header 410 an a tunneling request.

In the upstream HTTP header 410 for an upstream connection, similarly, the METHOD_URL 411 is "POST http://httpserver.internet/document1/postmethod_temp11223344 HTTP/1.0". The second half "postmethod_temp11223344 HTTP/1.0" is the temporary unique character string added. TUNNELING_METHOD 415 of an upstream HTTP header 410 stores a character string of "POST_VIA_TUNNELING", by which the server 630 recognizes the received HTTP header 410 as a tunneling request.

Further, both the upstream HTTP headers 410 for the upstream and downstream connections have the same unique keyword "client1temp11223344" written in CONNECTION_KEY 416. When detecting this same unique keyword in CONNECTION_KEY 416, the server communication device 631 combines these two connections for bidirectional communication of the client 610. On the other hand, in the case of the client 640, another unique keyword, for example, "client2temp11223344" is written in the CONNECTION_KEY 416 of both the upstream HTTP headers 410 for another pair of upstream and downstream connections. When detecting this same unique keyword "client2temp11223344" in CONNECTION_KEY 416, the server communication device 631 combines these two connections for bidirectional communication of the client 640.

CONTENT_LENGTH 413 is set to 999,999,999 (1 Gigabyte). It is assumed that there is no case that data of 1-Gigabyte or more is transferred between a client and the server 630. Therefore, data smaller than 1 gigabyte can be transferred without the HTTP proxy 620 disconnecting during communication. In case of disconnection, reconnection would be made.

INITIAL CONNECTION OPERATION

As shown in FIG. 5, an initial connection sequence is composed of steps 510, 520, 530, 540, and 550.

At the first step 510, a downstream connection between the client communication device 612 and the server communication device 631 is established. Thereafter, at the first step 520, an upstream connection between the client communication device 612 and the server communication device 631 is established.

After the two connections have been established, the client communication device 612 sends an upstream HTTP header 410 as a tunneling GET header to the server communication device 631 on the downstream connection so as to set the downstream connection to a data receiving connection and then receives a downstream HTTP header 420 as a GET reply header (step 530).

Subsequently, the client communication device 612 sends an upstream HTTP header 410 as a tunneling POST header to the server communication device 631 on the upstream connection so as to set the upstream connection to a data sending connection (step 540).

When the steps 530 and 540 have been completed, the client communication device 612 changes state into communication-ready and then data cells 430 can be transferred between the client communication device 612 and the server communication device 631 as described before (step 550).

At the step 534 in the step 530, the received GET reply is used for error-check by the client communication device 612. In the prior art, when the connections have been established, state is changed into communication-ready. However, in the case where the HTTP communication gate functions as a proxy, the establishment of the connections is not coincident with the setup of the upstream and downstream connections. To handle such a case, the bidirectional communication system according to the present embodiment performs error-check using a reply to the GET-method tunneling header. The error-check operation is performed asynchronous to the transfer of a data cell on the upstream connection because it takes much time for connection setup if the initial data cell 430 is transferred after receiving a reply to the GET-method tunneling header.

The sequence of steps 510–550 is important for the present embodiment to allow stable bidirectional communication between higher-level applications in the presence of delay in the network.

Since the establishment of two connections is not synchronous with the setup of the upstream and downstream connections, it is very important which one of the connection establishment and the upstream/downstream connection setup is completed earlier. In almost all applications, a transaction begins with transmission from a client to a server. Therefore, it is better that the downstream connection is set earlier than the upstream connection because a reply packet to a data cell 430 traveling through the upstream connection is reliably sent back to the client through the downstream connection. This improves the stability of communication at an initial communication stage where a timing problem is particularly likely to occur.

The most remarkable feature is that a data call 430 can be transferred on the upstream connection before setting the downstream connection. In other words, a data cell 430 can be transferred on the POST-method connection (step 550) before receiving the GET reply from the server 630 (step 534).

It should be noted that passing of information might occur in the case where there is a remarkable difference between the setup speeds of two connections for bidirectional communication due to the presence of a proxy through which data is transferred between the client and the server.

Figure 6:
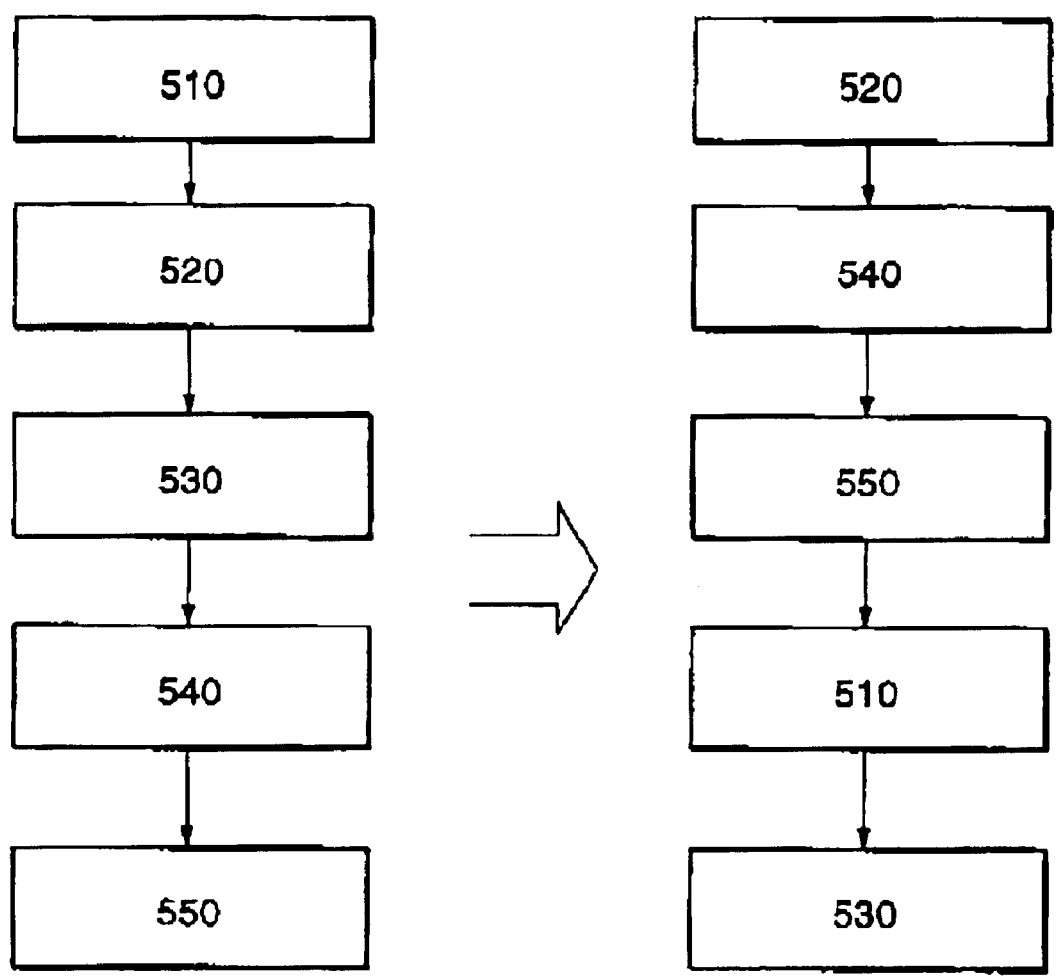
FIG. 6 is a flowchart showing a change in the order of the initial connection sequence due to an establishment delay between upstream and downstream connections.

As shown in FIG. 6, when passing of information occurs, the initial connection sequence from the point of view of the server communication device 631 is changed from the sequence of steps 510, 520, 530, 540, and 550 to the sequence of steps 520, 540, 550, 510, and 530. In other words, the upstream connection setup is completed before the downstream connection setup, so that the server communication device 631 processes data cells received through the upstream connection without its way back.

According to the embodiment of the present invention, such an information-passing problem can be solved by buffering data at the inflow permission ard inhibition steps 535 and 543. More specifically, when the step 540 is performed before the step 530, the tunneling information 440 indicates POST-method but the GET-method tunneling information has been never received. Therefore, the tunneling header analyzer 306 instructs the inflow suppressor 302 to buffer the received data and stop data inflow through a corresponding upstream connection from then on (step 543).

When the step 530 is performed, the GET-method tunneling information has been received. Therefore, the tunneling header analyzer 306 instructs the inflow suppressor 302 to release the inhibition of inflow.

In this manner, the inflow suppressor 302 allows the connection sequence to be changed so as to match the receiving sequence and thereby a delay in connection due to the presence of a proxy can be eliminated, resulting in stable bidirectional communication. A data cell 430 produced at the client communication device 612 is transferred to the server communication device 631 in real time through the upstream connection. On the other hand, a data cell 430 produced at the serer communication device 631 is transferred to the client communication device 612 in real time through the downstream connection.

It is the same with the client 640. Accordingly, information can be shared in real time among the clients 610 and 640 through the a 630.

As described before, the HTTP proxy 620 may disconnect the communication. In case of disconnection, reconnection would be made. In such a case, METHOD_URL 411 of an upstream HTTP header 410 in updated but CONNECTION_KEY 416 uses the previous unique keyword. Therefore, the server communication device 631 is allowed to combine the two connections for bidirectional communication.

What is claimed is:

1. A bidirectional communication method between a server and each of a plurality of clients through an HTTP (Hyper Text Transfer Protocol) communication gate allowing only HTTP traffic to pass through, the method comprising the steps of:

a) establishing two connections between the server and the client;

b) setting one of the two connections to an upstream connection using POST method of HTTP to allow real-time data transfer from the client to the server, c) setting the other of the two connections to a downstream connection using GET method of HTTP lo allow real-time data transfer from the server to the client; and d) transferring data between the server and the client through the upstream connection and the downstream connection, wherein the real-time data transfer is inhibited between the client and the server until the two connections have been completely set up;

wherein the HTTP communication gate is an HTTP proxy having a caching function;

at the client, e) adding a temporary unique character string, which is different from previous temporary unique character strings used by the client and by other clients, to content location information of each of a POST-method HTTP header and a header of a data cell so as to avoid the caching function of the HTTP proxy; and at the server, f) ignoring the temporary unique character string added in the content location information received from the client.

2. The bidirectional communication method according to claim 1, wherein the step (b) comprises the steps of:

at the client, b.1) generating a POST-method HTTP header;

b.2) setting a content_length field of the POST-method HTTP header to a permissible maximum value; and the step (d) comprises the step of:

at the client, d.1) generating data cells at timing of data transfer requested by a client application;

d.2) transferring the data cells to the server through the HTTP communication gate in real time.

3. The bidirectional communication method according to claim 1, wherein the step (c) comprises the steps of:

at the server, c.1) generating a GET-method HTTP header;

c.2) setting a content_length field of the GET-method HTTP header to a permissible maximum value; and the step (d) comprises the step of:

at the server, d.3) generating at least one data cell at timing of data transfer requested by a server application;

d.4) transferring the at least one data cell to the client through the HTTP communication gate in real time.

4. The bidirectional communication method according to claim 2, wherein the step (c) comprises the steps of:

at the server, b.1) generating a GET-method HTTP header;

b.2) setting a content_length field of the GET-method HTTP header to a permissible maximum value; and the step (d) comprises the step of:

at the server, d.3) generating at least one data cell at timing of data transfer requested by a server application;

d.4) transferring the at least one data cell to the client through the HTTP communication gate in real time.

5. A bidirectional communication method between a server on the Internet and each of a plurality of clients on an Intranet through an HTTP (Hyper Text Transfer Protocol) communication gate allowing only HTTP traffic to pass through, the method comprising the steps of:

a) establishing two connections between the server and the client;

b) setting one of the two connections to a downstream connection using GET method of HTTP to allow real-time data transfer from the server to the client;

c) after having set connection, setting the other of the two connections to an upstream connection the one of the two connections to the downstream using POST method of HTTP to allow real-time data transfer from the client to the server;

d) after having set the upstream and downstream connections, transferring data between the server and the client through the upstream connection and the downstream connection;

at the client, e) sending a tunneling GET header to the server through the one of the two connections, the tunneling GET header being included in a particular cell and being distinguished from other data cells by having a particular field of a header portion of the particular cell set lo a predetermined value that is not included in the other data sells; and f) sending a tunneling POST header to the server through the other of the two connections independently of sending the tunneling GET header;

at the server, g) when receiving the tunneling POST header before the tunneling GET header, stopping data reception from the client until the downstream connection has been set;

wherein the HTTP communication gate is an HTTP proxy having a caching function;

at the client, h) adding a temporary unique character string, which is different from previous temporary unique character strings used by the client and by other clients, to content location information of each of a POST-method HTTP header and a header of a data cell so as to avoid the caching function of the HTTP proxy; and at the server, i) ignoring the temporary unique character string added in the content location information received from the client.

6. The bidirectional communication method according to claim 1, further comprising the steps of:

at the client, generating a POST-method HTTP header including a unique keyword; and at the server, managing the upstream and downstream connections using the unique keyword received from the client.

7. The bidirectional communication method according to claim 6, wherein, when a connection formed using a unique keyword is disconnected, the client makes reconnection to the server using the unique keyword previously used.

8. The bidirectional communication method according to claim 5, further comprising the steps of:

at the client,
generating a POST-method HTTP header including a unique keyword; and at the server,
managing the upstream and downstream connections using the unique keyword received from the client.

9. The bidirectional communication method according to claim 8, wherein, when a connection formed using a unique keyword is disconnected, the client makes reconnection to the server using the unique keyword previously used.

10. A bidirectional communication system comprising:

a server on the Internet;

a plurality of clients on an Intranet; and an HTTP (Hyper Text Transfer Protocol) communication gate allowing only HTTP traffic to pass through so as to connect the server and each of the plurality of clients, wherein each of the clients comprises:

a connection controller for establishing two connections between the server and the client;

a tunneling header generator for generating a tunneling header so that one of the two connections is set to an upstream connection using POST method of HTTP and the other of the two connections is set to a downstream connection using GET method of HTTP;

a first protocol converter for converting client application data into a data block to be transferred to the server; and a first reverse protocol converter for converting a received data block from the server into server application data, and the server comprises:

a tunneling header analyzer for analyzing the tunneling header received from the client to determine whether the upstream and downstream connections have been set, wherein data transfer between the client and the server is inhibited until the tunneling header analyzer determines that both the upstream and downstream connections have been set;

a second protocol converter for converting server application data into a data block to be transferred to the client; and a second reverse protocol converter for converting a received data block from the client into client application data;

wherein the HTTP communication gate is an HTTP proxy having a caching function;

wherein the tunneling header generator of the client adds a temporary unique character string, which is different from previous temporary unique character strings used by the client an-d by other clients, to content location information of each of a POST method HTTP header and a header of a data block so as lo avoid the caching function of the HTTP proxy.

11. The bidirectional communication system according to claim 10, wherein the server further comprises:

an inflow suppressor for suppressing data block inflow from the client when receiving a tunneling POST header before a tunneling GET header and releasing inhibition of the data block inflow when the tunneling GET header has been received.

12. The bidirectional communication system according to claim 1, wherein the step b) is initiated by the client outputting an upstream HTTP header having a POST indication in a Method URL field of the upstream HTTP header and with tunneling information included in another field the upstream HTTP header, and wherein the step c) is initiated by the client outputting an upstream HTTP header having a GET indication in the Method URL field of the upstream HTTP header and with the tunneling information included in another field of the upstream HTTP header.

13. The bidirectional communication system according to claim 12, wherein real-time transfer of data between the server and client is performed by way of cells that have a same information in the Method URL field as one of the upstream HTTP header and the downstream HTTP header in a header portion of the respective cells for performing the real-time transfer of data, but which do not have the tunneling information included in the header portion of the respective cells.

14. The bidirectional communication system according to claim 11, wherein the server further comprises:

a buffer for holding incoming data for a period of time when the incoming data blow inflow is operational, wherein the incoming data held in the buffer is released to a processor of the server upon releasing inhibition of the incoming data block inflow.

\* \* \* \* \*